(12) United States Patent
Amin et al.

(10) Patent No.: US 6,922,816 B1
(45) Date of Patent: Jul. 26, 2005

(54) METHOD AND SYSTEM FOR ADJUSTING SETTINGS WITH SLIDER CONTROLS HAVING VARIABLE SENSITIVITY

(75) Inventors: Sandip A. Amin, Austin, TX (US); James Lee Lentz, Austin, TX (US); Minh Nguyen, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 900 days.

(21) Appl. No.: 09/645,172

(22) Filed: Aug. 24, 2000

(51) Int. Cl.[7] .................................................. G06F 3/00
(52) U.S. Cl. .................... 715/833; 715/732; 715/781; 715/784; 715/788; 715/841
(58) Field of Search .................... 345/732, 768, 345/781, 784, 785, 786, 787, 788, 810, 830, 841, 833, 831, 164, 167

(56) References Cited

U.S. PATENT DOCUMENTS

| | | | | |
|---|---|---|---|---|
| 5,615,347 A | * | 3/1997 | Davis et al. ................ | 345/833 |
| 6,128,006 A | * | 10/2000 | Rosenberg et al. ......... | 345/163 |
| 6,339,438 B1 | * | 1/2002 | Bates et al. ................ | 345/787 |
| 6,341,183 B1 | * | 1/2002 | Goldberg ................... | 382/276 |
| 6,411,274 B2 | * | 6/2002 | Watanabe et al. ........... | 345/684 |
| 6,486,896 B1 | * | 11/2002 | Ubillos ...................... | 345/784 |
| 6,570,594 B1 | * | 5/2003 | Wagner ...................... | 345/786 |

* cited by examiner

*Primary Examiner*—Kristine Kincaid
*Assistant Examiner*—Thomas J Joseph
(74) *Attorney, Agent, or Firm*—Sawyer Law Group LLP (57) ABSTRACT

Aspects for allowing adjustment of a setting via a slider bar displayed on a graphical user interface are provided. These aspects include providing a slider bar control button for the slider bar, and integrating fine and coarse adjustment control into the slider bar control button to allow precise manipulation of a value for the setting. The provision of a slider bar control button includes providing a thumbwheel control button with a central area for coarse adjustment control through repositioning of the thumbwheel control button, a top button substantially adjacent and above the central area for fine adjustment control to increase a setting value by a predetermined increment, and a bottom button substantially adjacent and below the central area for fine adjustment control to decrease a setting value by a predetermined increment. Alternatively, providing a slider bar control button includes providing a three section bar with a first section for coarse adjustment, a second section for fine adjustment up, and a third section for fine adjustment down. In yet another alternative, providing a slider bar control button includes providing a zoom control button that allows adjustment to a scale displayed for setting values and responds to separate selection interface means to increase and decrease the scale.

22 Claims, 9 Drawing Sheets

Variables:

MinValue: the lowest value that can be set with the slider
XMin: The screen x-coordinate of the leftmost position on the scale.
MaxValue: the highest value that can be set with the slider
XMax: The screen x-coordinate of the rightmost position on the scale.
SliderValue: The value specified by the position of the slider bar. Must lie between MinValue and MaxValue
SliderPos: the position of the slider bar in x-coordinates. Must lie between XMin and XMax Objects:

SliderBar: the object that represents the sliding portion of the control
AdjustUp: the fine adjustment up portion of the slider bar
AdjustDown: the fine adjustment down portion of the slider bar Functions:

xpos ( ): a function that returns the current position of the mouse pointer
SelectButtonDown( ): Returns TRUE if the mouse button is being held down, otherwise returns FALSE
SelectButtonClick( ): Returns TRUE if the mouse button has been clicked, otherwise returns FALSE
SelectButtonUp( ): Returns TRUE if the mouse button is up, otherwise returns FALSE
MouseMove( ): Returns TRUE if the mouse has moved, otherwise returns FALSE.

METHOD AND SYSTEM FOR ADJUSTING SETTINGS WITH SLIDER CONTROLS HAVING VARIABLE SENSITIVITY

FIELD OF THE INVENTION

The present invention relates to adjusting setting values for a computer system, and more particularly to slider controls with variable sensitivity for adjusting setting values.

BACKGROUND OF THE INVENTION

With the continued advancement of digital processing systems, software applications are used now to perform many of the tasks previously performed using physical devices.

For example, a computer system management application allows administrators of the system to assign how much data storage space is available for specific users of the system. Because storage is typically measured in megabytes or gigabytes, the potential range of settings is huge. Direct manipulation controls such as slider controls for defining the amount of storage assigned thus face a problem—a single mapping between movement of the mouse and movement of the slider control will either facilitate gross changes in value or small changes in value but not both. This is a particular problem when a length of the slider control is small when compared to the range of assigned values within that length.

In more concrete terms, say 100 megabytes of storage are available to be assigned using a slider control, with the left-hand side representing 0 megabytes and the right-hand side representing 100 megabytes. The administrator wants to assign exactly 25 megabytes. With a single mapping between mouse movement and slider movement on the screen, the administrator will easily be able to set the slider to approximately 25 megabytes by moving the mouse to the right or left based upon the length between the left hand side and the right hand side. However, in many cases it will be very difficult to set the slider to exactly 25 megabytes because the slightest nudge of the mouse position will cause the value to change by a large number of bytes (e.g., possibly on the order of several hundred or thousand) due to the ratio of the range of assigned values to the length between the left hand side and right hand side.

Accordingly, many applications require a subtask in which the user must precisely specify a value to many degrees of precision. Adjusting settings for these tasks often requires selection of a preset precision value from a list for performing fine adjustments. Alternatively, slide bars that allow coarse adjustments of limited precision between a preset minimum and maximum value for a setting are also sometimes used for selection of a value. Accordingly, what is needed is a system for allowing both coarse adjustments and fine adjustments to be made on an application utilizing one slider bar.

The present invention addresses such a need.

SUMMARY OF THE INVENTION

Aspects for allowing adjustment of a setting via a slider bar displayed on a graphical user interface are provided. These aspects include providing a slider bar control button for the slider bar, and integrating fine and coarse adjustment control into the slider bar control button to allow precise manipulation of a value for the setting. The provision of a slider bar control button includes providing a thumbwheel control button with a central area for coarse adjustment control through repositioning of the thumbwheel control button, a top button substantially adjacent and above the central area for fine adjustment control to increase a setting value by a predetermined increment, and a bottom button substantially adjacent and below the central area for fine adjustment control to decrease a setting value by a predetermined increment. Alternatively, providing a slider bar control button includes providing a three section bar with a first section for coarse adjustment, a second section for fine adjustment up, and a third section for fine adjustment down. In yet another alternative, providing a slider bar control button includes providing a zoom control button that allows adjustment to a scale displayed for setting values and responds to separate selection interface means to increase and decrease the scale.

With the present invention, a slider control with variable sensitivity is achieved through a slider bar control button with integrated coarse and fine adjustment capabilities. The slider bar control button allows more intuitive interaction for setting a value, while relying purely on direct manipulation (e.g., dragging with a mouse pointer). Further, the various embodiments also provide "affordances" or visual indications of the potential actions available to the user to increase the intuitive nature of the interaction. These and other advantages of the present invention will be more fully understood in conjunction with the following detailed description and accompanying the drawings.

DETAILED DESCRIPTION

The present invention relates to precise adjustments of value settings through slider controls for software applications. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

The present invention is implemented in a computer. In the preferred embodiment the present invention is implemented in a computer, which includes client programs, also known as application programs. One of ordinary skill in the art will recognize that any computer configuration may be used to implement the present invention, including a configuration wherein the client programs are resident in any computer.

Figure 1:
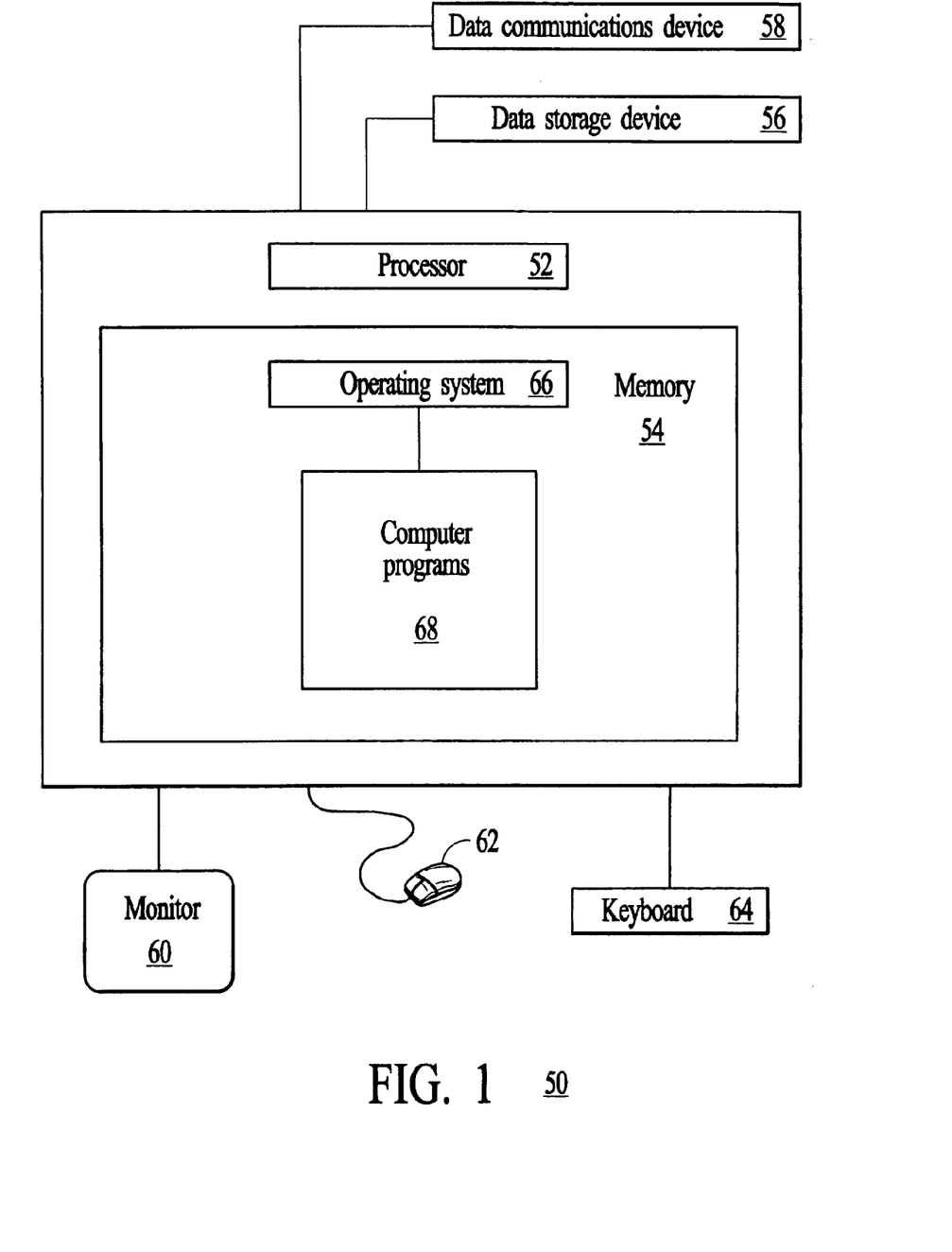
FIG. 1 illustrates a hardware environment used to implement the present invention.

Accordingly, FIG. 1 illustrates a hardware environment used to implement the present invention. As illustrated in FIG. 1, in the preferred embodiment the present invention is implemented in a computer 50. The computer 50 generally includes a processor 52, a memory 54 such as a random access memory (RAM), a data storage device 56 (e.g., hard drive, floppy disk drive, CD-ROM disk drive, etc.), a data communication device 58 (e.g., a modem, network interface device, etc.), a monitor 60 (e.g., CRT, LCD display, etc.), a pointing device 62 (e.g., a mouse, a track ball, a pad or any other device responsive to touch, etc.) and a keyboard 64. It is envisioned that attached to the computer 50 may be other devices such as read only memory (ROM), a video card drive, printers, peripheral devices including local and wide area network interface devices, etc. One of ordinary skill in the art will recognize that any combination of the above components may be used to configure the computer 50.

The computer 50 operates under the control of an operating system ("OS") 66, such as MVS®, AIX®, UNIX®, OS/2®, WINDOWS®, WINDOWS NT®, etc., which typically is loaded into the memory 104 during the computer 50 start up (boot-up) sequence after power-on or reset. In operation, the OS 66 controls the execution by the computer 50 of computer programs 68, including computer programs. Alternatively, a system and method in accordance with the present invention may be implemented with any one or all of the computer programs 68 embedded in the OS 66 itself without departing from the scope of the invention. Preferably, however, the client programs are separate from the computer programs.

The OS 66 and the computer programs 68 each comprise computer readable instructions which, in general, are tangibly embodied in or are readable from a media such as the memory 54, the data storage device 56 and/or the data communications device 58. When executed by the computer 50, the instructions cause the computer 50 to perform the steps necessary to implement the present invention. Thus, the present invention may be implemented as a method, apparatus, or an article of manufacture (a computer-readable media or device) using programming and/or engineering techniques to produce software, hardware, firmware, or any combination thereof.

In accordance with the present invention, various embodiments for a slider bar control button with integrated fine and coarse adjustment capabilities are presented that allow intuitive and direct manipulation of value settings displayed on a graphical user interface of the computer 50. These adjustment capabilities are provided via conventional programming techniques that are associated with a graphical user interface in a computer system.

Figure 2:
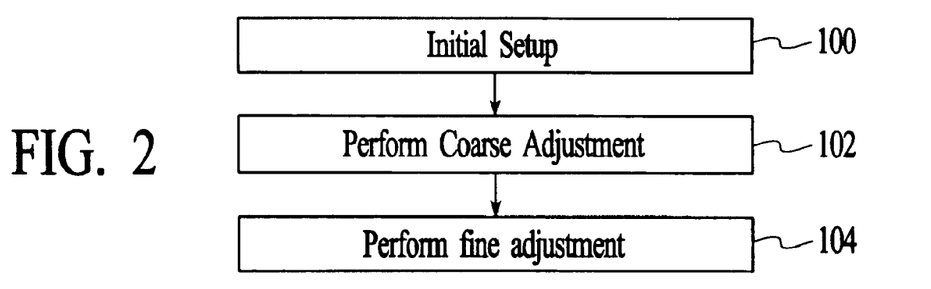
FIG. 2 illustrates an overall block flow diagram of slider bar control button processing in accordance with the present invention.
Figure 2A:
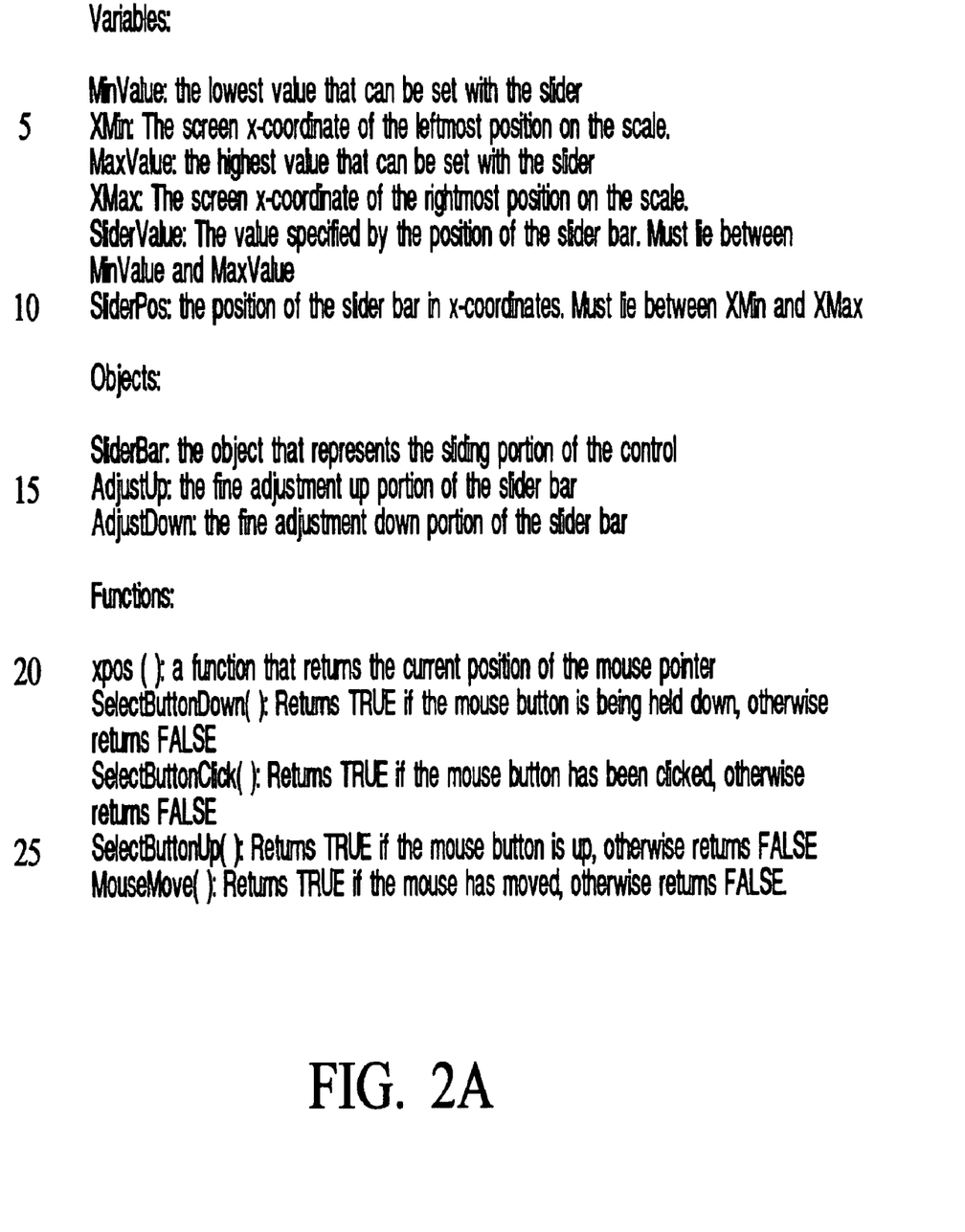
FIG. 2a provides a table of variables, objects, and functions.

FIG. 2 illustrates an overall block flow diagram of slider bar control button processing in accordance with the present invention. FIGS. 3, 4, 5, 6, 9 and 10 present more detailed flow chart diagrams of the steps of FIG. 2 for the various embodiments of the present invention. In conjunction with these flow charts, reference is made to FIGS. 7, 8, 11, 12 and 13, which illustrate slider bar control button representations associated with the various embodiments. For the discussion of the various embodiments represented by the figures, FIG. 2a provides a table of variables, objects, and functions referred to in FIGS. 2–13 that may be based upon an appropriate computer programming language such as C++, for example, provided via a computer readable media. Of course, the names presented are meant as illustrative and not restrictive of the names capable of being used. Further, reference is made to selection activity for the slider bar control button with a mouse pointing device in the present invention. It should be appreciated that a mouse pointing device is described as a preferred embodiment, but the aspects of the present invention may be applied for use with other pointing devices, if desired, as is well appreciated by those skilled in the art.

Referring now to FIG. 2, an overall process which allows for adjustment of a setting with a slider control having variable sensitivity begins with the setup of the slider bar control button, via step 100. Once the initial setup of the slider bar control button is completed, slide bar control button activity is performed. Selections that indicate coarse adjustment manipulation of the slider bar control button are performed via step 102 and selections that indicate fine adjustment manipulation of the slider bar control button are performed via step 104. It should be understood that steps 102 and 104 can be performed in any order and that use would be within the spirit and scope of the present invention.

Figure 3:
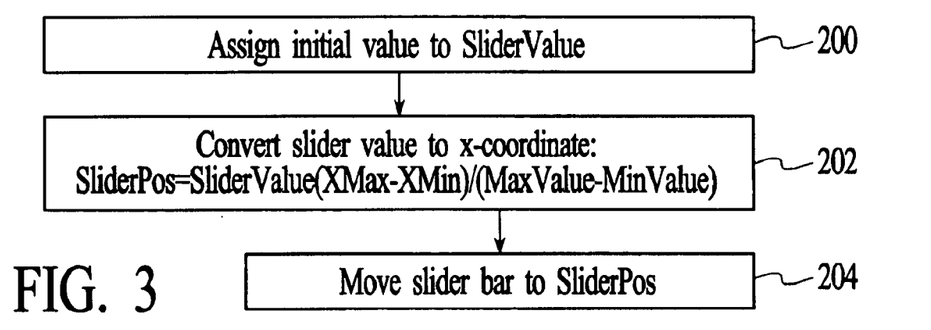
FIG. 3 illustrates steps for achieving initial setup of the slider bar control button.

FIG. 3 illustrates steps for achieving initial setup of the slider bar control button (step 100 of FIG. 1). As shown in FIG. 3, the initial setup step includes assigning an initial value to the SliderValue variable, via step 200. The slider value is then converted into an x-coordinate according to the equation shown in step 202.

To more particularly describe the application of this equation, refer now to the following. Assume, for example, the value from a leftmost position XMIN of the slider is 0 and the value of the rightmost position is 500. Also assume that length between the leftmost and rightmost positions is 200 pixels on a display screen. Assume also the initial assignment value is 250 or the halfway point between the leftmost and rightmost position.

Accordingly, the conversion of the slider value into the appropriate coordinate is accomplished in accordance with the equation $SLIDER\ POS$=Slider Value $(XMAX-XMIN)/(MAXVALUE-MINVALUE)$ For the above example, where XMAX−XMIN=200, $MAXVALUE-MINVALUE$=500

SLIDER VALUE=250

The above equation yields $SLIDERPOS$=250 (200/500)=100 pixels

Accordingly, with this set of assumptions, the slider position would be at 100 pixels or half way between the rightmost and leftmost positions.

Referring back to FIG. 3, the slider bar is moved to that SliderPos x-coordinate value, via step 204. Fine and coarse adjustments to the slider bar are then performed, as described in more detail hereinbelow for the various embodiments of the present invention.

Figure 4:
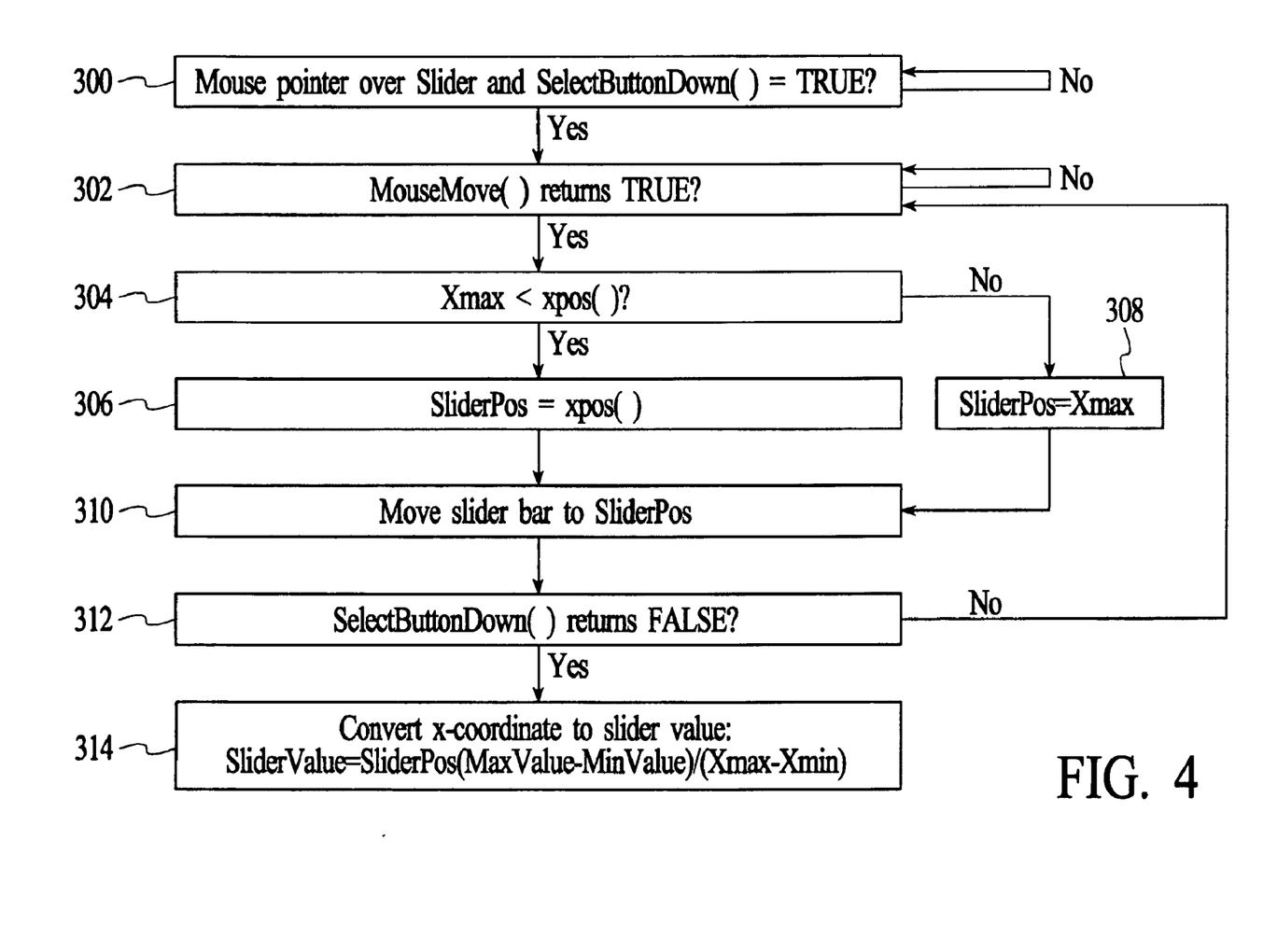
FIG. 4 illustrates traditional coarse adjustment processing.

FIG. 4 illustrates traditional coarse adjustment processing. The coarse adjustment begins with a determination of whether the mouse is positioned over the slider bar control button and whether a main selection button on the mouse is being selected, via step 300. When the mouse is positioned over the slider bar and the main selection button is selected, a determination is then made as to whether the mouse is being moved, via step 302. When the mouse is being moved, the position of the mouse relative to a maximum position for the slider bar control button is determined, via step 304.

If the coordinate of the slider position is at the rightmost position on the scale (XMAX), is less than the current position of the mouse pointer (XPOS), then the slider position is equal to XPOS position, via step 306. Thereafter, the slider bar moves to a slider position, via step 310. On the other hand, if the screen X coordinate of the rightmost position of the pointer is greater than the current position of the mouse pointer, then the slider position is equal to the highest position on the scale, via step 308, and the slider bar is moved to that slider position, via step 310. This adjustment of the bar position via step 302—310 continues until the selection button is no longer selected, via step 312. Once the adjustment to the position is stopped, the x coordinate for the position is converted to a setting value on the slider, e.g., according to the equation shown, via step 314. It should be noted that the equation is the same as that noted with respect to FIG. 3, except the slider value is being determined rather than the slider position.

Figure 5:
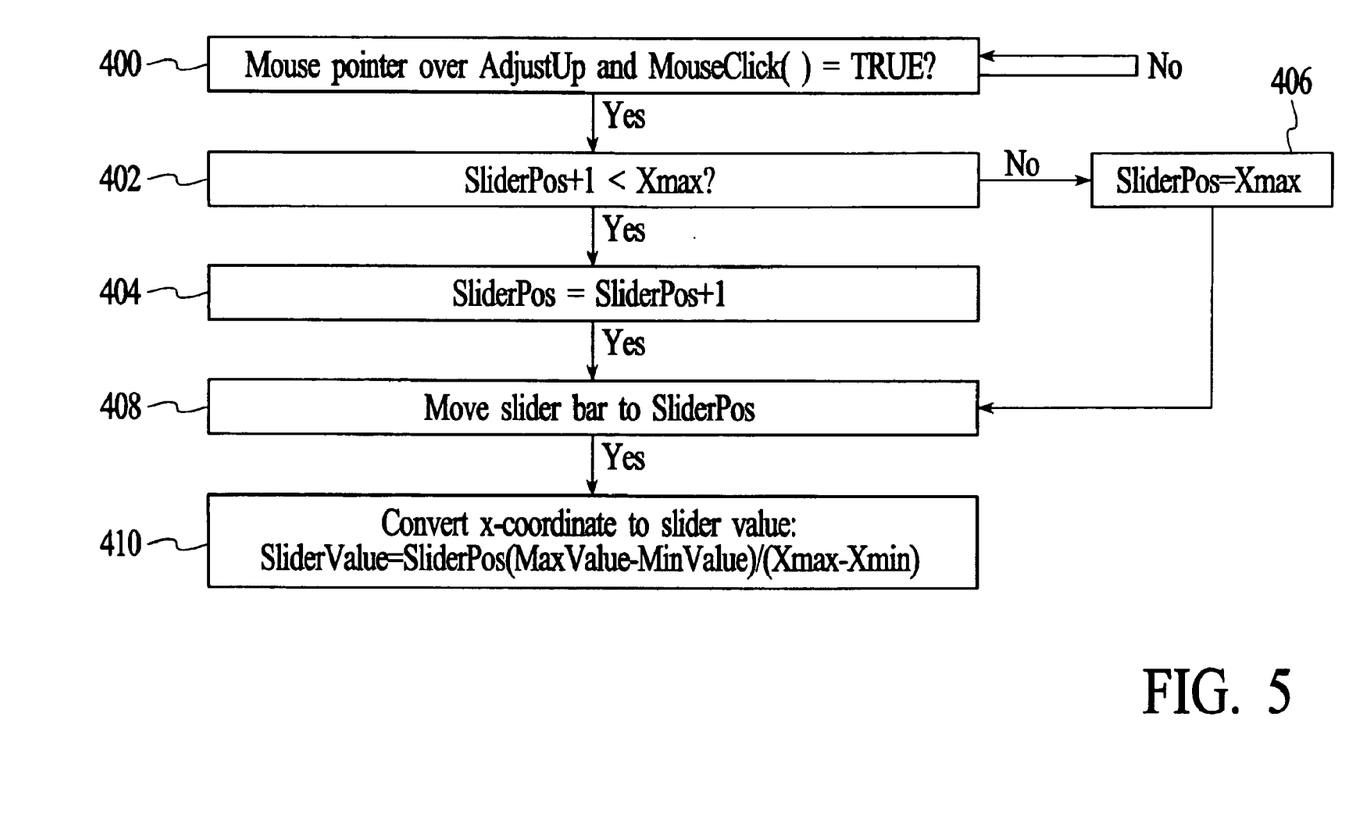
FIG. 5 illustrates fine adjustments for increasing a value with the slider control button in accordance with the present invention.
Figure 6:
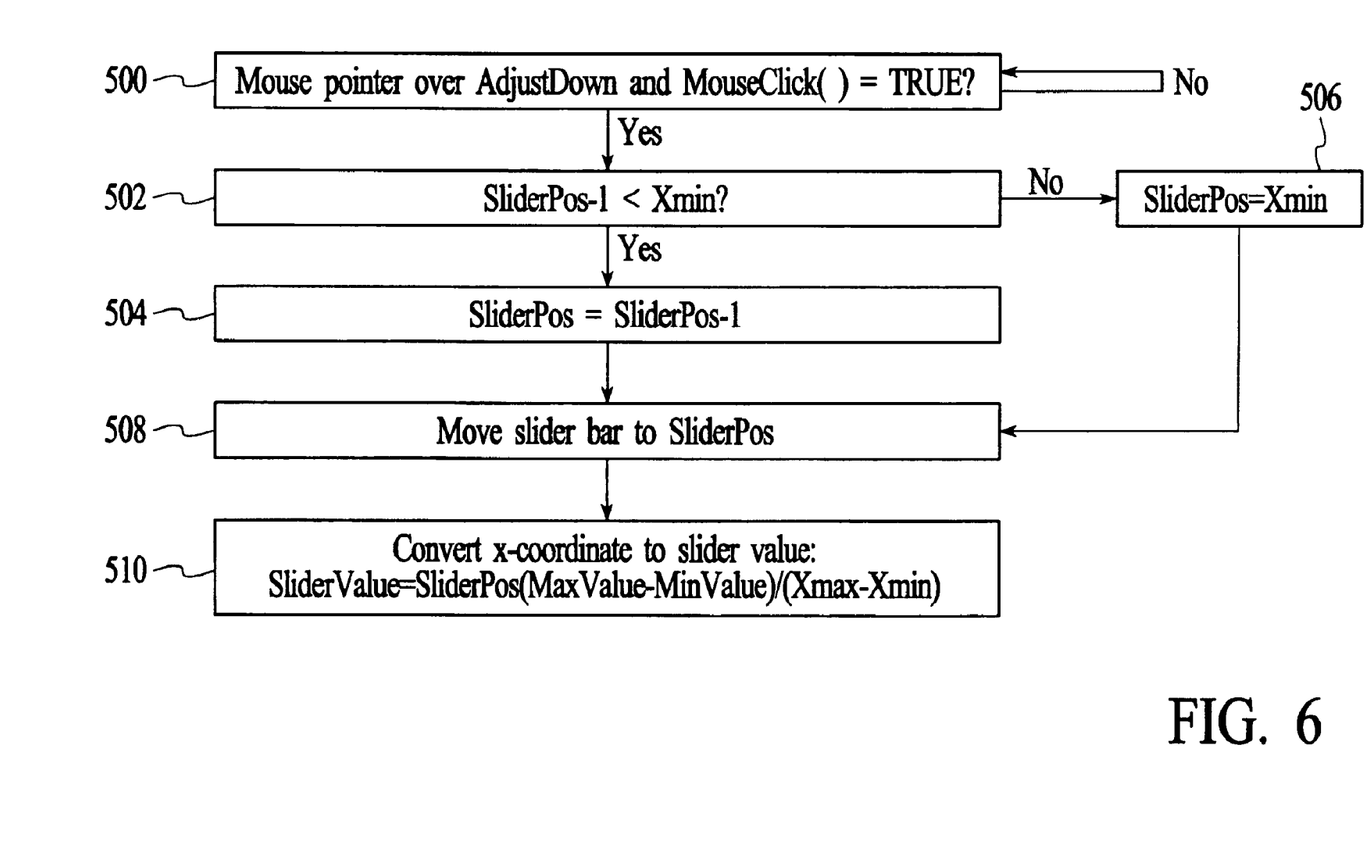
FIG. 6 illustrates fine adjustments for decreasing a value with the slider control button in accordance with the present invention.
Figure 6A:
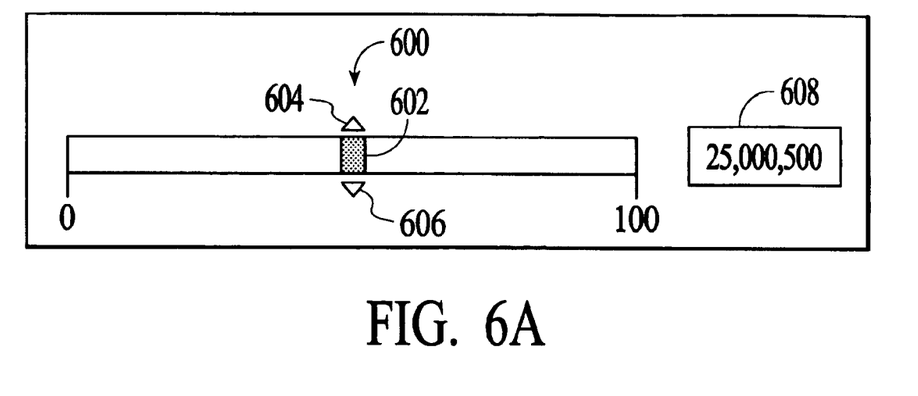
FIGS. 6a–6e illustrate adjustments for decreasing a value by successive steps of 100 bytes for each mouse click.
Figure 6B:
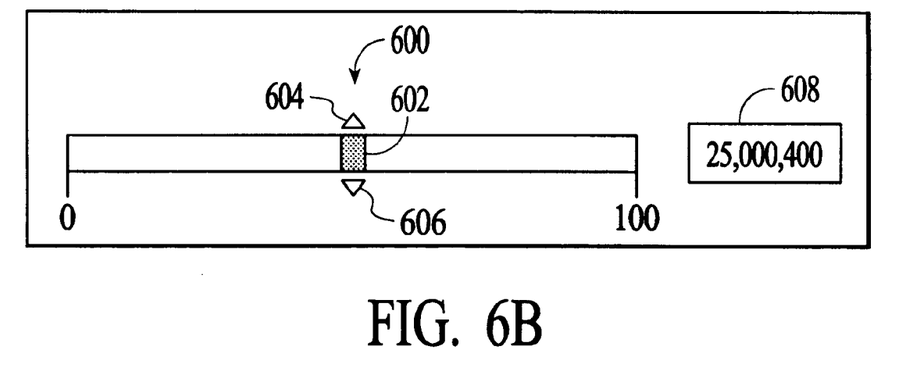
Figure 6C:
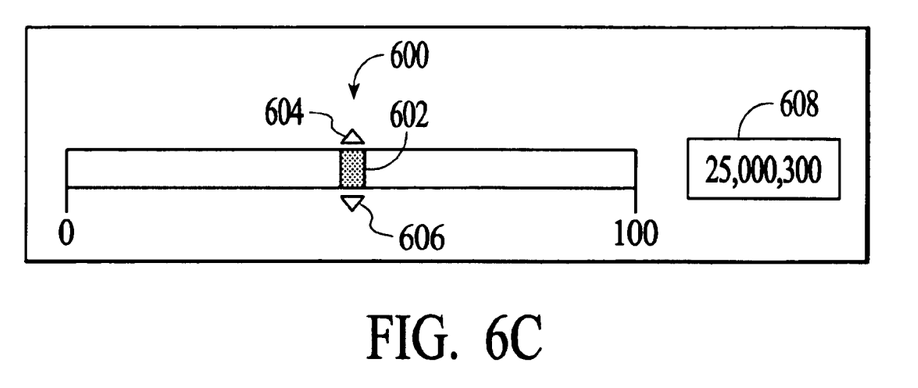
Figure 6D:
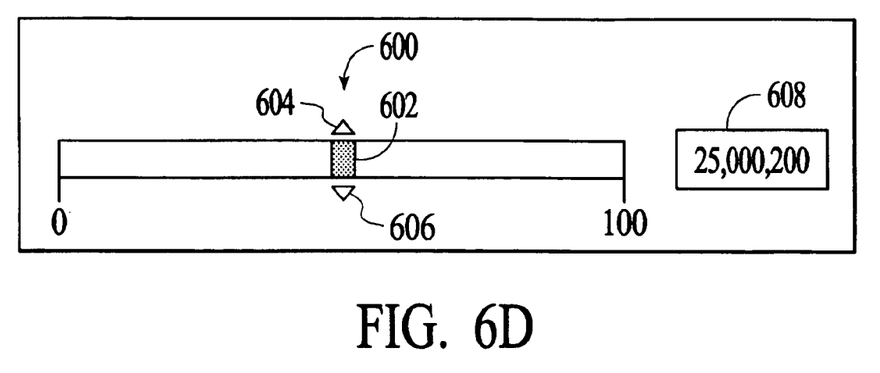
Figure 6E:
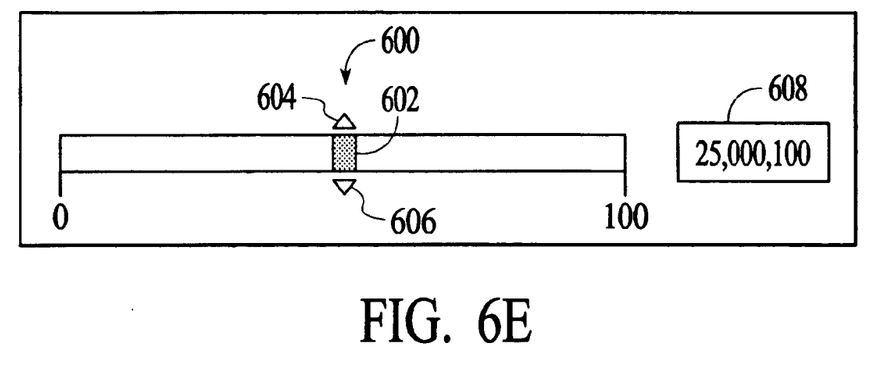

FIGS. 5 and 6 illustrate the performance of fine adjustment with the slider bar control button in accordance with the present invention. FIG. 5 illustrates fine adjustments for increasing a value. FIG. 6 illustrates fine adjustments for decreasing a value. Referring first to FIG. 5, the fine adjustment begins with a determination of whether the mouse's position is over the adjust up slider bar control button of the fine adjustment portion of the slider bar control and whether the main selection button is selected, via step 400. When the mouse is positioned over the adjust up fine adjustment portion of the slider bar control, and the main selection button is selected, a determination is made as to whether the slider position is less than the XMAX position, via step 402. If the slider position is less than the XMAX position, then the current position of the slider bar is increased by a preset increment, e.g., a value of 1, via step 404. Thereafter, the slider bar is moved to the slider position, via step 408, and thereafter the x coordinate is converted to a slider value according to the equation represented in step 410. If on the other hand, the slider position in step 402 is greater than XMAX, then the slider position is set to XMAX, via step 406, and steps 408 and 410 are repeated.

Referring now to FIG. 6, the fine adjustment begins with a determination of whether the mouse's position is over the adjust down slider bar control button of the fine adjustment portion of the slider bar control and whether the main selection button is selected, via step 500. When the mouse is positioned over the adjust down fine adjustment portion of the slider bar control, and the main selection button is selected, a determination is made as to whether the slider position is less than an XMAX position, via step 502. If the slider position is less than the XMAX position, then the current position of the slider bar is decreased by a preset increment, e.g., a value of 1, via step 504. Thereafter, the slider bar is moved to the slider position, via step 508, and thereafter the x coordinate is converted to a slider value according to the equation represented in step 510. If, on the other hand, the slider position in step 502 is greater than XMAX, then the slider position is set to XMAX, via step 506, and steps 508 and 510 are repeated.

Figure 7:
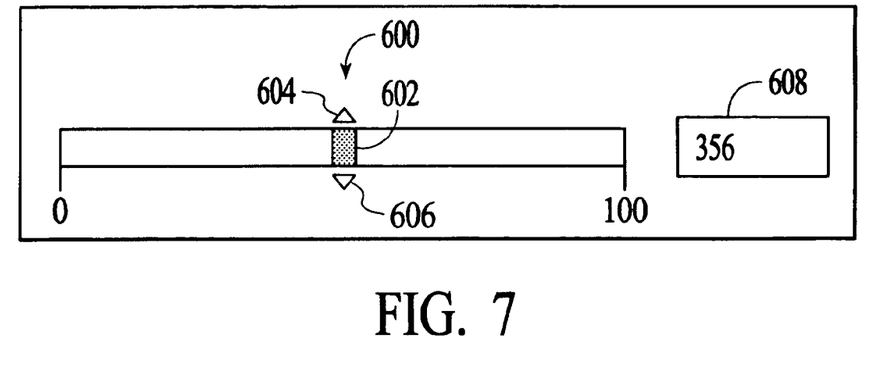
FIG. 7 illustrates a slider control with a slider bar control button 600 that operates in accordance with the processing described in FIGS. 3–6.

FIG. 7 illustrates a slider control with a slider bar control button 600 that operates in accordance with the processing described with reference to FIGS. 3–6. Coarse values are set by clicking and dragging the rectangular area 602 of the slider bar control button. Above and below the rectangular area 602 are fine and coarse adjustment portions 604 and 606 of the slider bar control button 600, represented as up and down triangles. A text box 608 may also be associated with the control for displaying numeric values. Fine adjustments to increase or decrease the value of the setting incrementally are thus made by clicking on the appropriate portion, i.e., on the up 604 or down 606 triangle. The slider bar control button 600 thus provides the equivalent of a thumbwheel type of an interface for the slider bar control button. In one embodiment, the user could be provided the option to define the precision of both the fine and coarse adjustment settings.

The following is an example of an application of the slider control with variable sensitivity. This example will employ the embodiment represented in FIG. 6. The following is a detailed description of how the embodiment in FIG. 6 would enable the value to be set precisely.

Assume that 100 megabytes of storage are available to be assigned using a slider control, with the left-hand side representing 0 megabytes and the right-hand side representing 100 megabytes. The administrator wants to assign exactly 25 megabytes.

The initial position of the slider is a setting of 0 megabytes, the leftmost possible position of the control. "0" is displayed in the text box (608). Furthermore, in this example, we will assume that the absolute precision of the control is 100 bytes and that a single click of the fine adjustment controls 604 and 606 will change the setting by 100 bytes. First the user makes the coarse adjustment by dragging the slider control to the right, approximately 25% of the width of the slider control.

The user positions the mouse pointer over the central part of the slider control (602). The user depresses the select button and moves the mouse to the right until the slider control (600) is approximately 25% of the settable range of the control and releases the mouse button. The value in the text box (608) will typically be near the desired setting but not exactly. For purposes of illustration, we will say that this coarse movement set a value of 25,000,500.

Next the user makes a fine adjustment to set the value to exactly 25,000,000. The user moves the mouse down slightly until the mouse pointer is above the "down" adjustment (606). The user then depresses and releases (clicks) the mouse button 5 times. As is shown in FIGS. 6a–6e, with each click the set value is decreased by 100 bytes and the final setting is 25,000,000 bytes. Accordingly, as is seen from the above, the slider bar can be efficiently located at a precise setting.

Figure 8:
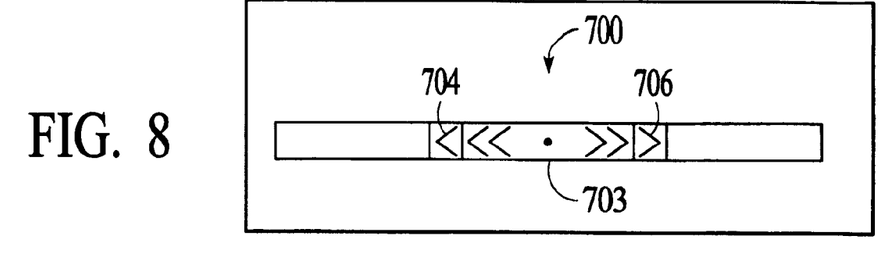
FIG. 8 illustrates the initial setup, where a default scale for the slider bar is set.

In an alternate embodiment, a slider bar control button 700 also provides integrated fine and coarse adjustment capabilities, as shown in FIG. 8. The area of the slider bar control button 700 (called the "thumb") that can be manipulated is divided into three sections that are sensitive to mouse selections/"clicks". A first section 702, marked in the illustration with "<<>>", is dragged to the right or left for coarse settings. Second and third sections 704 and 706, marked with "<" and ">", are positioned adjacent to the first section 702 and are used to make fine adjustments up or down from the coarse setting.

Figure 9:
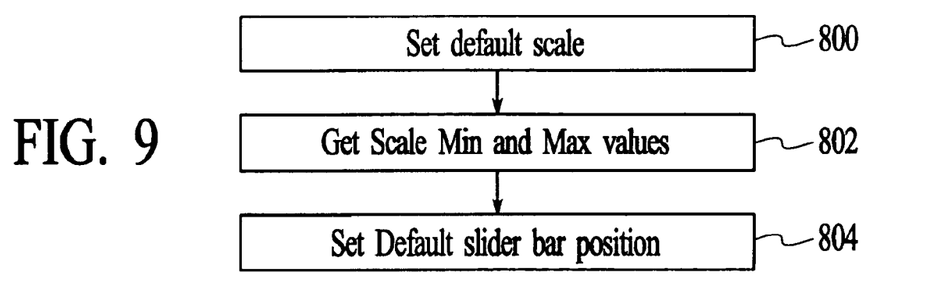
FIG. 9 illustrate the steps for the "zoom" selection.

The embodiment of FIG. 9 utilizes the mouse device driver to affect the sensitivity of the slider bar control button 700. A device driver is a special type of software that acts as an interface between hardware devices and the operating system. In this case, a mouse device driver receives data from the mouse related to mouse movement and direction, and mouse button clicks. The device driver then makes this information available to a windowing system of the operating system so that the mouse pointer (sometimes called the mouse cursor) on the display is moved in concert with the physical movements of the mouse. The mouse device driver includes a function that maps the distance traveled by the mouse to distance traveled by the mouse pointer. Typically, graphical operating systems allow users to adjust this mapping function ("gain") to accommodate varying user preferences. Thus, the gain can be set low so that a large movement of the mouse is required to move the mouse pointer a set distance, or the gain can be set high so that a small movement of the mouse will move the mouse pointer the same distance.

As in the embodiment of FIG. 7, when a window is opened that includes a slider control, the slider bar control button 700 is moved to its starting position based on a previous setting or some other value. When a SelectButtonDown event (e.g., on a right-handed mouse, this is holding the left-most button down) is detected and the mouse pointer is over either of the "slow" regions of the slider bar control button 700 (i.e., sections 704 or 706), the gain of the mouse device driver is set to a low speed. When the mouse button is released, the gain setting is restored to the prior preference. When a SelectButtonDown event is detected and the mouse pointer is over the "fast" region of the slider bar control button 700 (i.e., section 702), no change is made in the gain setting.

Thus, for the purposes of the slider bar control button 700, preferably the following speeds are associated with the sections 702, 704, and 706:
Section 904 "<" Slow;
Section 902 "<< >>" Normal Speed; and
Section 906 ">" Slow.

While FIG. 7 illustrates 702, 704, and 706 as being arranged "< <<>>>", alternate arrangements and symbols may be used. For example, "<<o>>" could be used, where "<<" and ">>" would set the mouse movement gain to low and "o" would have no effect on gain. In still another alternative, regions of the slider control could be defined as "<> <<>>", where the sections for "<" and ">" would set the gain to low and the "<<>>" side would set the gain to normal. Further, greater multiples of regions and symbols could also be used to achieve sensitivity in the slider bar control button across a broader range of gain settings, if desired.

In another embodiment, fine and coarse adjustment integration into a slider bar control button affect the scale of the slider control and do not affect the manner in which the slider bar control button moves. The process includes the initial setup (step 100 of FIG. 2), as shown in FIG. 9, where a default scale for the slider bar is set, via step 900, preset maximum and minimum values for the scale are retrieved, via step 902, and an initial slider bar position is set based on a previous or preset value, via step 904.

Figure 10:
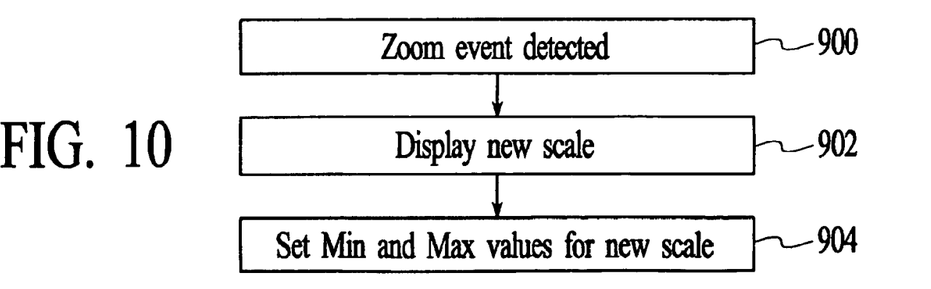
FIG. 10 illustrates a slider bar control button in a default scale display of a slider control.

Once the slider bar is initialized, slider movement occurs according to the steps shown for coarse adjustments in the flow diagram of FIG. 4. However, the ability to more precisely adjust the setting value with the slider bar control button occurs through changes of the scale of the slider bar, i.e., when a "zoom" selection occurs with the slider bar control button. FIG. 10 illustrates the steps for the "zoom" selection. When a "zoom" event is detected, via step 900, a new scale is displayed on the slider bar, via step 902. The new scale results in the setting of new minimum and maximum values for the slider bar, via step 904, where the minimum and maximum values reflect the increase or decrease of the scale by a predetermined factor.

Figure 11:
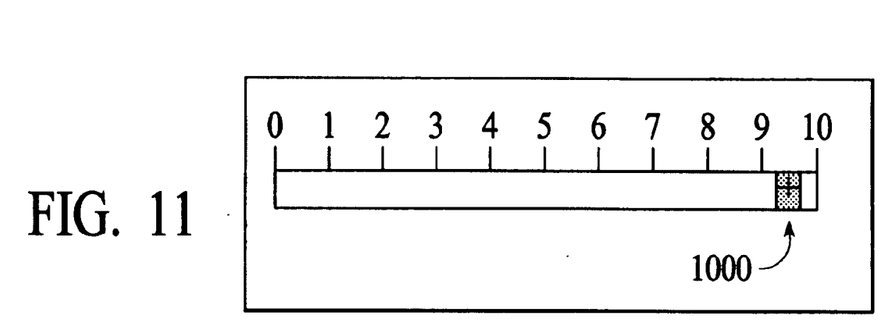
FIG. 11 illustrates a slider bar control button in a default scale display of a slider control.
Figure 12:
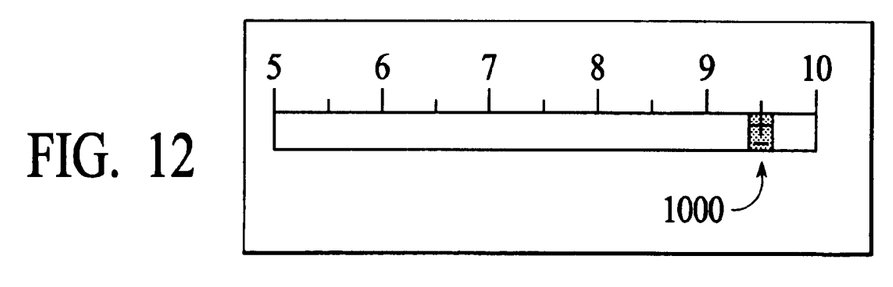
FIG. 12 illustrates the slider bar control button after a zoom-in event with the scale precision doubled.
Figure 13:
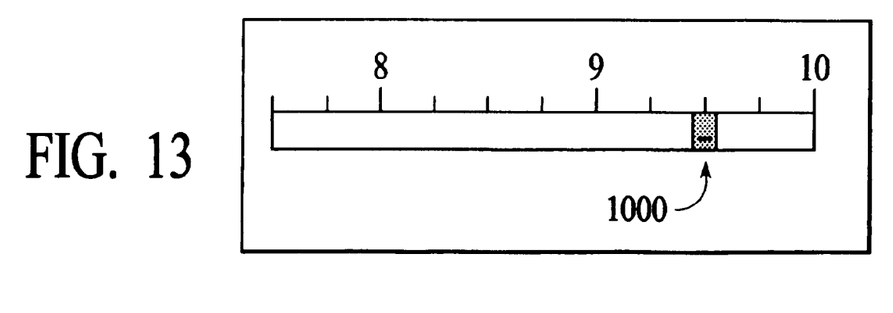
FIG. 13 illustrates the slider bar control button after another zoom-in event with the scale precision quadrupled.

By way of example, FIG. 11 illustrates a slider bar control button 1000 in a default scale display of a slider control. FIG. 12 illustrates the slider bar control button 1000 after a zoom-in event with the scale precision doubled (i.e., increased by a factor of two). FIG. 13 illustrates the slider bar control button 1000 after another zoom-in event with the scale precision quadrupled. The utilization of a "zoom" feature in a slider bar control button to magnify or reduce the scale of a slider control provides for more coarse or fine adjustments as necessary. In this embodiment, keyboard augmentation or use of secondary mouse controls are used to indicate zoom events that magnify or reduce the slider control scale. For example, on a three button mouse, mouse button one could be used to drag the slider bar control button back and forth, while clicking mouse button two could decrease the precision of the scale, and clicking mouse button three could increase the precision of the scale.

As the magnitude of the scale is altered, the position of the slider bar control button changes accordingly. Suitable indications of available changes in the scale are provided with the slider bar control button, e.g., by "+" and "−" symbols on the slider bar control button 1000, as shown in FIGS. 11, 12 and 13. Thus, a single "+" suitably indicates that the precision of the scale can be increased (see 1000, FIG. 11), while a single "−" suitably indicates that the precision of the scale can be decreased (see 1000, FIG. 13). The presence of both symbols indicates that the precision can be altered in either direction (see 1000, FIG. 12).

In accordance with the present invention, various embodiments for a slider bar control button with integrated fine and coarse adjustment capabilities are presented that allow intuitive and direct manipulation of value settings displayed on a graphical user interface of the computer 100.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for allowing adjustment of a setting via a slider bar displayed on a graphical user interface, the method comprising:
   providing a slider bar control button for the slider bar by providing a thumbwheel control button on the graphical user interface; and
   integrating fine and coarse adjustment control into the slider bar control button to allow precise manipulation of a value for the setting.

2. The method of claim 1 wherein providing a thumbwheel control button further comprises providing a central area for coarse adjustment control through repositioning of the thumbwheel control button.

3. The method of claim 2 wherein providing a thumbwheel control button further comprises providing a top button substantially adjacent and above the central area for fine adjustment control to increase a setting value by a predetermined increment.

4. The method of claim 3 wherein providing a thumbwheel control button further comprises providing a bottom button substantially adjacent and below the central area for fine adjustment control to decrease a setting value by a predetermined increment.

5. The method of claim 4 wherein the predetermined increment comprises a value of one.

6. A method for allowing adjustment of a setting via a slider bar displayed on a graphical user interface, the method comprising:

providing a slider bar control button as a three section bar for the slider bar on the graphical user interface with a first section for coarse adjustment, a second section for fine adjustment up, and a third section for fine adjustment down to allow precise manipulation of a value for the setting; and dragging the slider bar control button at a slower pace when one of the second and third sections is selected than when the first section is selected.

7. The method of claim 6 further comprising providing the second and third sections substantially adjacent to the first section.

8. The method of claim 7 further comprising providing one of the second and third sections to a left side of the first section and one of the second and third sections to a right side of the first section.

9. The method of claim 7 further comprising providing each of the second and third sections on a single side of the first section.

10. The method of claim 6 further comprising providing the first section as a larger section than the second and third sections.

11. A system for adjusting a setting value with a slider bar displayed on a graphical user interface, the system comprising:

a slider bar control button comprising a thumbwheel control button on the graphical user interface having integrated fine and coarse adjustment controls to allow precise manipulation of a value for a setting; and selector means for interacting with the slider bar control button to perform the manipulation of the value for the setting.

12. The system of claim 11 wherein the thumbwheel control button further comprises a button with a central area for coarse adjustment control through repositioning of the thumbwheel control button.

13. The system of claim 12 wherein the thumbwheel control button further comprises a top button substantially adjacent and above the central area for fine adjustment control to increase a setting value by a predetermined increment.

14. The system of claim 13 wherein the thumbwheel control button further comprises a bottom button substantially adjacent and below the central area for fine adjustment control to decrease a setting value by a predetermined increment.

15. The system of claim 14 wherein the predetermined increment comprises a value of one.

16. A system for adjusting a setting value with a slider bar displayed on a graphical user interface, the system comprising:

a slider bar control button comprising a three section bar button with a first section for coarse adjustment, a second section for fine adjustment up, and a third section for fine adjustment down to allow precise manipulation of a value for a setting; and selector means for interacting with the slider bar control button to perform the manipulation of the value for the setting, wherein the slider bar control button moves at a slower pace when one of the second and third sections is selected than when the first section is selected with the selector means.

17. The system of claim 16 wherein the second and third sections comprise sections substantially adjacent to the first section.

18. The system of claim 17 wherein one of the second and third sections comprise a section to a left and one of the second and third section comprise a section to a right side of the first section.

19. The system of claim 17 wherein each of the second and third sections comprise sections on a single side of the first section.

20. The system of claim 16 wherein the first section comprises as a larger section than the second and third sections.

21. Computer readable means containing program instructions for allowing adjustment of a setting via a slider bar displayed on a graphical user interface, the program instructions comprising:

providing a slider bar control button for the slider bar as a thumbwheel control button with a central area for coarse adjustment control through repositioning of the thumbwheel control button, a top button substantially adjacent and above the central area for fine adjustment control to increase a setting value by a predetermined increment, and a bottom button substantially adjacent and below the central area for fine adjustment control to decrease a setting value by a predetermined increment.

22. Computer readable means containing program instructions for allowing adjustment of a setting via a slider bar displayed on a graphical user interface, the program instructions comprising:

providing a slider bar control button for the slider bar as a three section bar with a first section for coarse adjustment, a second section for fine adjustment up, and a third section for fine adjustment down to allow precise manipulation of a value for the setting, and dragging the slider bar control button at a slower pace when one of the second and third sections is selected than when the first section is selected.

* * * * *

UNITED STATES PATENT AND TRADEMARK OFFICE
CERTIFICATE OF CORRECTION

PATENT NO. : 6,922,816 B1  Page 1 of 1
DATED : July 26, 2005
INVENTOR(S) : Amin et al.

It is certified that error appears in the above-identified patent and that said Letters Patent is hereby corrected as shown below:

<u>Column 4,</u>
Line 48, add -- that -- after "also" and before "the".

<u>Column 6,</u>
Lines 37 and 39, delete "100" and replace with -- 1000 --.

Signed and Sealed this

Twenty-third Day of May, 2006

JON W. DUDAS
*Director of the United States Patent and Trademark Office*